United States Patent
Hen et al.

(10) Patent No.: US 12,282,546 B2
(45) Date of Patent: Apr. 22, 2025

(54) ABNORMAL CLASSIC AUTHORIZATION DETECTION SYSTEMS

(71) Applicant: Microsoft Technology Licensing, LLC, Redmond, WA (US)

(72) Inventors: Idan Hen, Tel-Aviv (IL); Ilay Grossman, Tel-Aviv (IL); Avichai Ben David, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 17/516,183

(22) Filed: Nov. 1, 2021

(65) Prior Publication Data

US 2023/0132611 A1    May 4, 2023

(51) Int. Cl.
G06F 21/55    (2013.01)
H04L 9/40    (2022.01)

(52) U.S. Cl.
CPC ...... G06F 21/554 (2013.01); *G06F 2221/034* (2013.01); *H04L 63/1416* (2013.01); *H04L 63/1425* (2013.01); *H04L 63/20* (2013.01)

(58) Field of Classification Search
CPC ............... G06F 21/554; G06F 21/577; G06F 2221/034; H04L 63/1416; H04L 63/1425; H04L 63/20
See application file for complete search history.

(56) References Cited

U.S. PATENT DOCUMENTS

| | | | |
|---|---|---|---|
| 11,620,481 B2* | 4/2023 | Givental | G06F 18/2433 706/22 |
| 2017/0111381 A1* | 4/2017 | Jones | G06F 21/554 |
| 2020/0285737 A1* | 9/2020 | Kraus | G06F 21/552 |
| 2021/0117868 A1* | 4/2021 | Sriharsha | G06F 16/24568 |
| 2021/0194913 A1* | 6/2021 | Hecht | H04L 63/105 |

OTHER PUBLICATIONS

"Recent Progress of Anomaly Detection"—Xu et al, Wiley/Online Library, Jan. 13, 2019 https://onlinelibrary.wiley.com/doi/epdf/10.1155/2019/2686378 (Year: 2019).*
"Calculating Anomaly Score for Anomaly Detection Using One-Class SVM"—Stack Overflow, Dec. 28, 2018 https://stackoverflow.com/questions/53956538/calculating-anomaly-score-for-anomaly-detection-using-one-class-svm (Year: 2018).*
"International Search Report and Written Opinion Issued in PCT Application No. PCT/US22/044777", Mailed Date: Jan. 10, 2023, 11 Pages.

* cited by examiner

*Primary Examiner* — Randy A Scott
(74) *Attorney, Agent, or Firm* — Wade IP Law PLLC

(57) ABSTRACT

A system to detect an abnormal classic authorizations, such as in a classic authorization system of a resource access management system, and take action is described. The system determines an anomaly score in from a model applied to a classic assignment event. An indicator score is determined from the classic assignment event applied to domain-based rules. The security action is taken based on a combination of the anomaly score and the indicator score.

20 Claims, 4 Drawing Sheets

ABNORMAL CLASSIC AUTHORIZATION DETECTION SYSTEMS

BACKGROUND

Cyberattacks can include unauthorized operations done to an item in a computer network such as to an item in a storage device, or storage, and in particular, as unauthorized attempts to access an item in cloud storage. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Access to the resource access management service 202 to perform actions on the resources 208 can be provided via a resource authorization administrators delivered as a classic authorization system or via a fine-grained access authorization system. Examples of a fine-grained access authorization system include features such as role-based access control, commonly referred to as RBAC, or attribute-based access control, commonly referred to as ABAC. A classic authorization system with classic administrators, however, does not provide for additional users that have fine-grained access. A classic authorization system, in contrast to fine-grained access authorization systems, provides access to resources managed via a limited number of administrators roles, or classic administrators, which are distinguishable from the fine-grained access administrators. Classic administrators have permissions that include full access to a subscription in the resource access management system and can manage resources using a portal and various APIs such as a resource manager API with a resource manager program.

In one example of a cyberattack, an attacker who has gained access to an account may attempt to modify access privileges to perform actions that evade detection. For instance, an attacker who has gained access to an account in a resource management system may attempt to create or assign a classic authorization system administrator role to an entity in the control of the attacker to perform actions without detection. Data related to the classic authorization can be called a classic assignment event.

A system to detect an abnormal classic authorization and take action is described. An anomaly score is determined from suspected anomalies in a model related to a classic assignment event, such as assignment of the classic administrator position of the classic administrator positions. An indicator score is determined from the classic assignment event applied to domain-based rules regarding the assignment of the classic administrator position of the classic administrator position. An action is taken based on the security scores.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
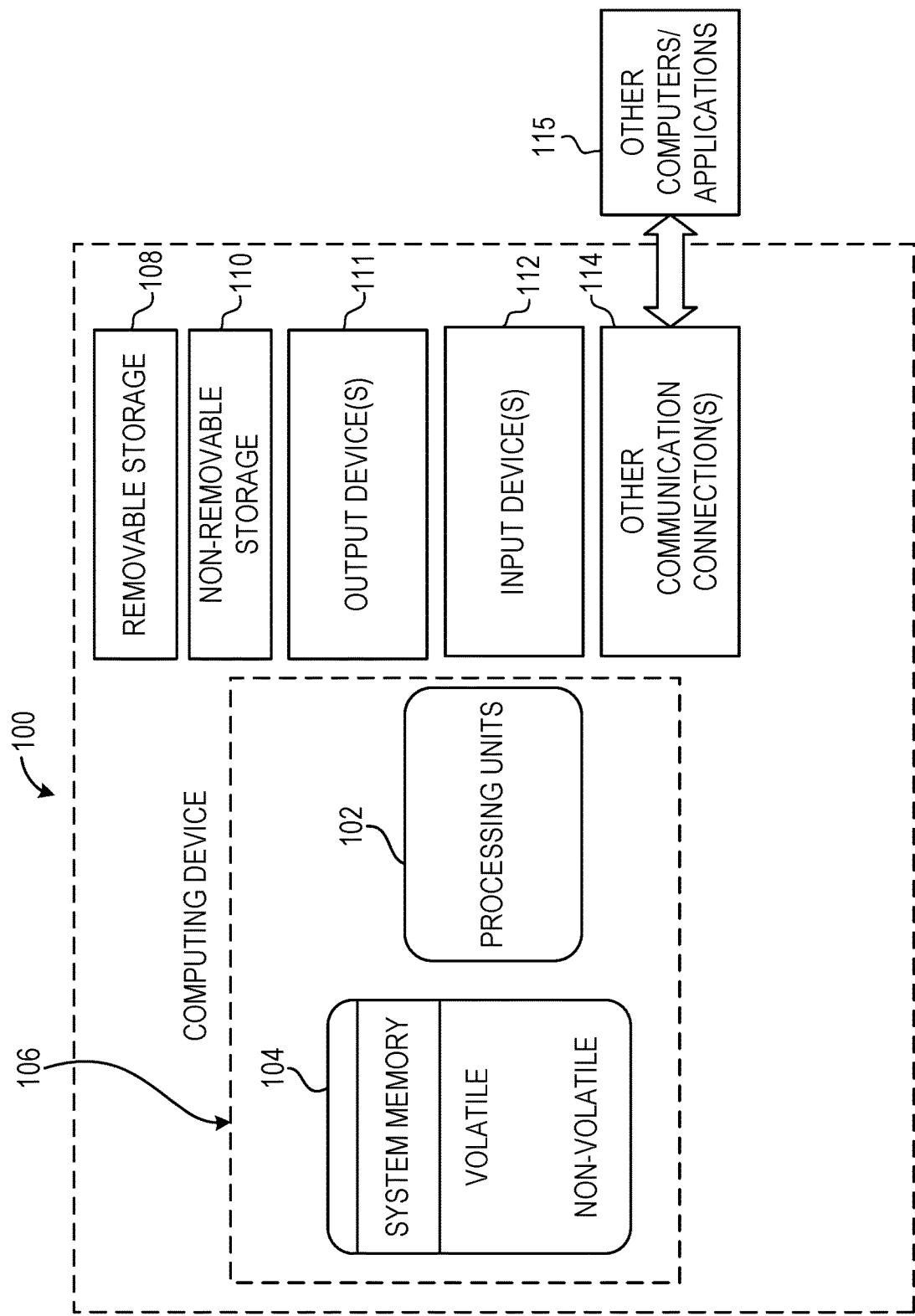
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
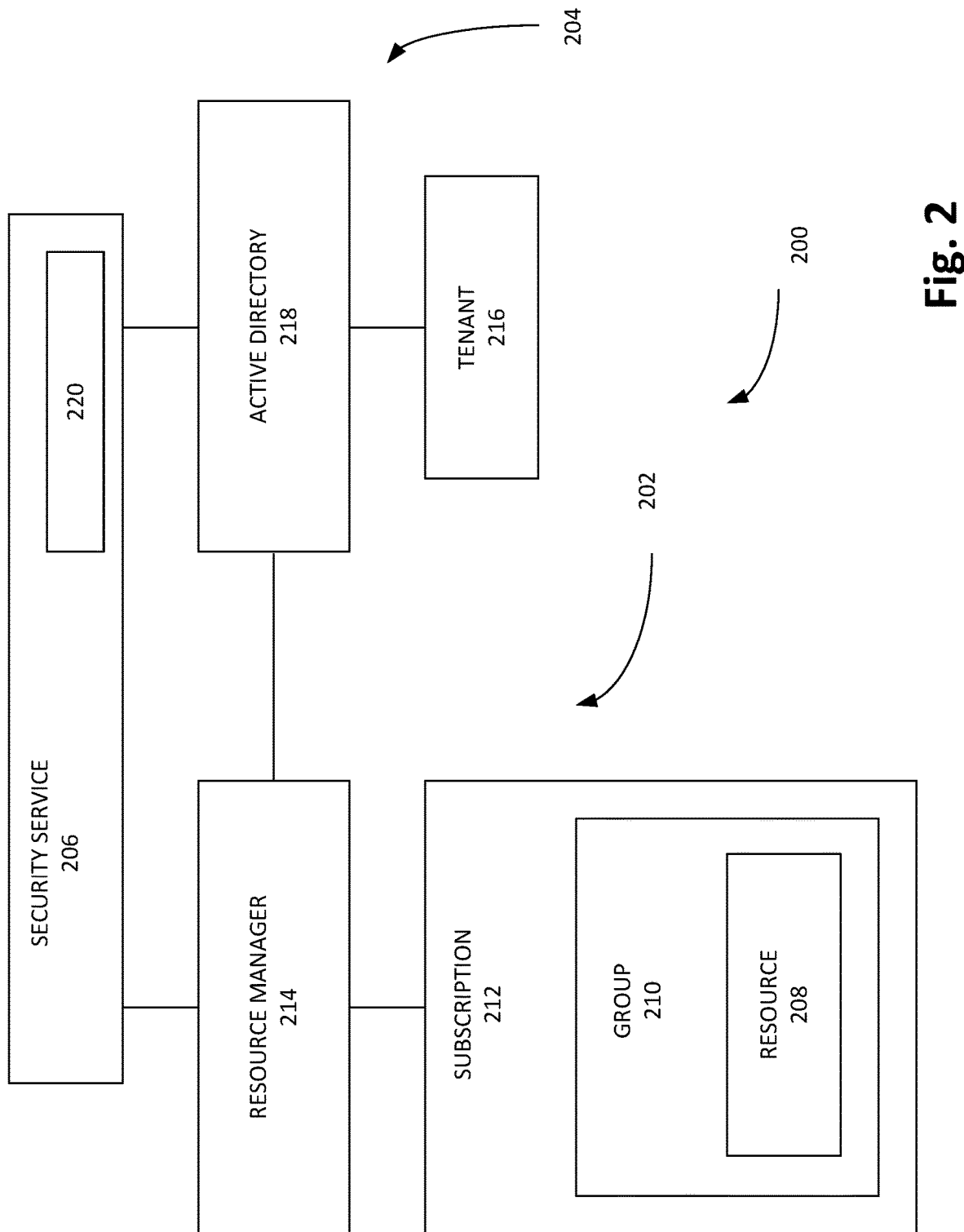
FIG. 2 is a block diagram illustrating an example computer network such as a cloud-computing environment including an abnormal classic authorization detector that can be implemented with the computing device of FIG. 1.

FIG. 2 illustrates an example cloud computing environment 200, which can be configured as a computer network and include hardware and programming and implemented in various settings such as a datacenter. The example cloud computing environment 200 can include resource access management system 202, identity and access management system 204, and security service 206.

The resource access management system 202 manages an entity referred to as a resource 208. Resource 208 can include virtual machines, virtual networks, storage accounts, web applications, databases are examples of resources 208 in the cloud computer environment 200. Resources 208 can include a plurality of resources. Resources 208 can belong to a resource group 210 in the resource access management 202. Resource group 210 includes a container of resources 208. In one example, the resource group 210 includes a container of resources 208 that can be managed as a single entity such as based on lifecycle or security. For instance, resources 208 for an n-tier application may be created or deleted as a resource group 210. The resource group 210, which can be a plurality of resource groups, are associated with a subscription 212. The subscription 212 groups together resource groups 210 and the associated resources 208.

The cloud computing environment 200 may include a front end with many services that orchestrate the functions of the platform including resource manager 214. For instance, the resource manager 214 can host a RESTful API that clients may use to manage resources 208, resource groups 210, or subscription 212. In some examples, the resource manager 214 can manage resources 208 directly from a client request, and in other examples the resource manager 214 can connect via a resource provider to complete the request. For example, a user may manage resources 208 of an associated subscription 212 via a client such as a web portal, command line interface, or other mechanism operably coupled to the resource manager 214, such as a mechanism to connect via REST API, to the resource manager 214. Depending on the configuration of the resource manager 214, the request to manage the resource 208 can be provided directly or via an associated resource provider of the resource 208.

In one example, access to the resources 208 associated with the resource manager 214 can be implemented with an identity and access management system 204, such as with a directory 218. Users are segmented into tenants 216, and a tenant 216 represents a dedicated instances of the directory 218 associated with an enterprise or organization. In one example, the subscription 212 is also associated with a tenant 216, For instance, the tenant 216 may include an account via the cloud computing provider in the cloud computing environment 200 as a subscription 212. Each client request to manage a resource 208 in a particular subscription 212 requires that the user has an identity account in the associated tenant 216. The directory 218 can provide a check that the user has sufficient permission to make the request. Permissions are assigned to users and associated with users with an authorization system.

Access to the resource access management service 202 to perform actions on the resources 208 can be provided via a resource authorization administrators delivered as a classic authorization system or via a fine-grained access authorization system. Examples of a fine-grained access authorization system include features such as role-based access control, commonly referred to as RBAC, or attribute-based access control, commonly referred to as ABAC. Attribute-based access control (ABAC) is an authorization system that defines access based on attributes associated with security principals, resources, and environment. Each of the classic authorization system and the fine-grained authorization system may include a limited number of administrators that have wide-scale access permissions to the resources. A classic authorization system with classic administrators, however, does not provide for additional users that have fine-grained access.

RBAC assigns roles to enforce permissions. A role assignment includes of three elements: security principal, role definition, and scope. A security principal is an object that represents a user, group, service principal, or managed identity, for instance, that is requesting access to resources 208. A role can be assigned to any of these security principals. A role definition, or role, is a collection of permissions. A role definition lists the actions that can be performed, such as read, write, and delete. Roles can be high-level, like owner, or specific, like virtual machine reader. For example, an owner role allows a user to perform any action on a resource. Scope is the set of resources that the access applies to. An assigned role can further limit the actions allowed by defining a scope. For instance, a security principal can be assigned a role of a website contributor, but only for one resource group.

With ABAC, a security principal is granted access to a resource based on attributes. ABAC builds on RBAC by adding role assignment conditions based on attributes in the context of specific actions. A role assignment condition is an additional check that can optionally add to q role assignment to provide more fine-grained access control. A condition filters down permissions granted as a part of the role definition and role assignment. For example, a condition can be added that requires an object to have a specific tag to read the object. RBAC and ABAC systems may include built-in roles that can be assigned different scopes, or may include custom roles.

A classic authorization system, in contrast to fine-grained access authorization systems, provides access to resources managed via a limited number of administrators roles, or classic administrators, which are distinguishable from the fine-grained access administrators. A classic authorization system is not a fine-grained authorization system such as RBAC or ABAC. In one example, the limited number of administrator positions is three administrator positions each having a classic permission. For instance, the three administrator positions or classic administrators include an account administrator, a service administrator, and a co-administrator. Classic administrators have permissions that include full access to the subscription 212 and can manage resources using the portal and various APIs such as a resource manager API with resource manager 214. In one instance, the account used to sign up for platform in the resource access management system 202 is automatically set as both the account administrator and service administrator with the associated classic permissions. Then, additional co-administrators with the associated classic permissions can be added. The service administrator and the co-administrators can include similar access and permissions of users who have been assigned the owner role at the subscription scope as fundamental roles in a fine-grained access authorization system.

In the example of the three classic administrators, there can be one account administrator per platform account, one service administrator per subscription, and up to two-hundred co-administrators per subscription. For example, an account administrator can include a billing owner of the subscription 212. The account administrator can access the platform portal and manage billing for all subscriptions in the account, change billing for a subscription, create new subscriptions and in some conditions cancel subscriptions, and change the service administrator. In a new subscription, the account administrator becomes the service administrator. The service administrator has the equivalent access of a user who is assigned an owner role at the subscription scope in an RBAC. Further, the service administrator has full access to the platform portal. The service administrator can manage services in the portal, and cancel the subscription, and assign users to the co-administrator role. The co-administrator has the equivalent access of a user who is assigned an owner role at the subscription scope in an RBAC. The co-administrator includes the same access privileges as the service administrator, but cannot change the association of subscriptions to directories, and the co-administrator can assign users to the co-administrator role, but cannot change the service administrator.

Directory administrators can manage the identity and access management system 204 such as create or edit users of the tenant 216, assign directory administrative roles to others, reset passwords, and manage licenses and domains. Examples of directory administrators can include a global administrator, a user administrator, and a billing administrator. The global administrator in one example, can manage access to all administrative features in the directory 218, as well as services that federate to the directory, assign administrator roles to others, and reset the password for users and administrators. The user administrator can create and manage all aspects of users, manage support tickets, monitor service health, and change passwords for users and some administrators such as other user administrators. The billing administrator can make purchases, manage subscriptions, manage support tickets, and monitor service health.

Authorization systems for the resource access management service 202 can be implemented via the resource access management system 202 or the identity and access management system 204. In one example, a user (or security principal) acquires a token for the resource manager 214. The token can include the user's group memberships. The user makes request, such as a REST API call, to the resource manager 214 with the token attached. The resource manager 214 can retrieve the assignments, such as role assignments and deny assignments in a fine-grained authorization system, that apply to the resource 208 upon which the action is being taken. If the user includes a classic administrator permission, access is granted to the permission. For fine-grained access, the resource manager 214 narrows the role assignments that apply to this user or their group and determines what roles the user has for this resource. The resource manager 214 determines if the action in the request is included in the roles the user has for the particular resource. If the user doesn't have a role with the action at the requested scope, access is not granted. Otherwise, the resource manager checks if a deny assignment applies. If a deny assignment applies, access is blocked. Otherwise, access is granted.

Permissions via classic administrator positions can be granted via the resource access management system 202. In one example, a classic administrator with access to the resource manager 214 may adjust permissions of other users if such actions are within the permission of the classic administrator. For example, a user with service administrator permissions may assign co-administrator permissions to users. Further, users with co-administrator permissions may assign users to co-administrator permissions but cannot change which user is assigned to the service administrator permission. In one example, permissions of co-administrator and service administrator can be changed via a portal provided via the resource manager 214. The portal may provide a mechanism to access the classic administrator properties, and the properties may include assignments such as users to the roles of the service administrator, co-administrator, and account administrator. These users assigned to these roles may be changed or created, in the case of co-administrators, with appropriate permissions. The circumstances surrounding the assignment of classic administrator permissions to a user can be called a classic assignment event. Environment 200 or resource access management system 202 can keep track of actions with a number of mechanisms, such as via logs (not shown) that account for metadata such as who, what, where, when, and how for changes or updates to the administrators, role definition, or other features of system such as scope, in the authorization system or systems. The classic assignment event can be recorded and logs may be kept from a subscription perspective of the assignment event, from an assigner perspective (such as circumstances of the user making the permission assignment), and from an assignee perspective (such as circumstances of the user being assigned the permission). Information from each perspective may be stored in the environment 200 or resource access management system 202.

Cyberattacks can include unauthorized operations done to an item in a computer network such as to an item in a storage device, or storage, and in particular, as unauthorized attempts to access an item in cloud storage. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker. One way to gain access to someone else's account is by using social engineering techniques like phishing or by using a storage key that has unintentionally been leaked by an account owner. Hence, one challenge of storage security is to recognize suspicious activity in an account even when the activity is apparently being done by a legitimate user of the account.

In one example, an attacker who has gained access to an account may attempt to modify access privileges to perform actions that evade detection. For instance, an attacker who has gained access to an account in an environment such as environment 200 or resource management system 202 may attempt to create or assign a classic authorization system administrator role to an entity in the control of the attacker to perform actions without detection. In one example, the actions within co-administrator-based or service administrator-based permissions avoid detection. In another example, the attacker can update a role definition to escalate privileges of the account holder for cases in which the account holder has a weak fine-grained role definitions but the ability to update to a classic administrator to make it more permissive. In some examples, logs may be overwritten, and may not contain useful data regarding an attack if administrators or forensics personnel attempt to analyze an attack or a modified permission after the fact. An attacker with classic administrator permissions or privileges has broad control over resources 208, resource groups 210, and the subscription 212, as well the ability to grant other accounts broad control or to delete permissions for legitimate users.

Security service 206 may be applied to detect possible cyberattacks in environment 200, such as resource access management system 202, and to take actions, such as prevent access, notify security personnel, or log possible attacks, in response. For example, the security service 206 may provide security alerts and advanced threat protection to the environment 200 as a defender. When the defender detects a threat in any area of the environment 200, the defender can generate a security alert. These alerts describe details of the affected resources 208, suggested remediation steps, and in some cases an option to trigger a response. In one example, security service 206 includes an abnormal classic authorization detection system 220. The abnormal classic authorization detection system 220, in one example, can detect, track, and take actions in the case of a suspicious grant of permission to a user as a classic administrator.

Figure 3:
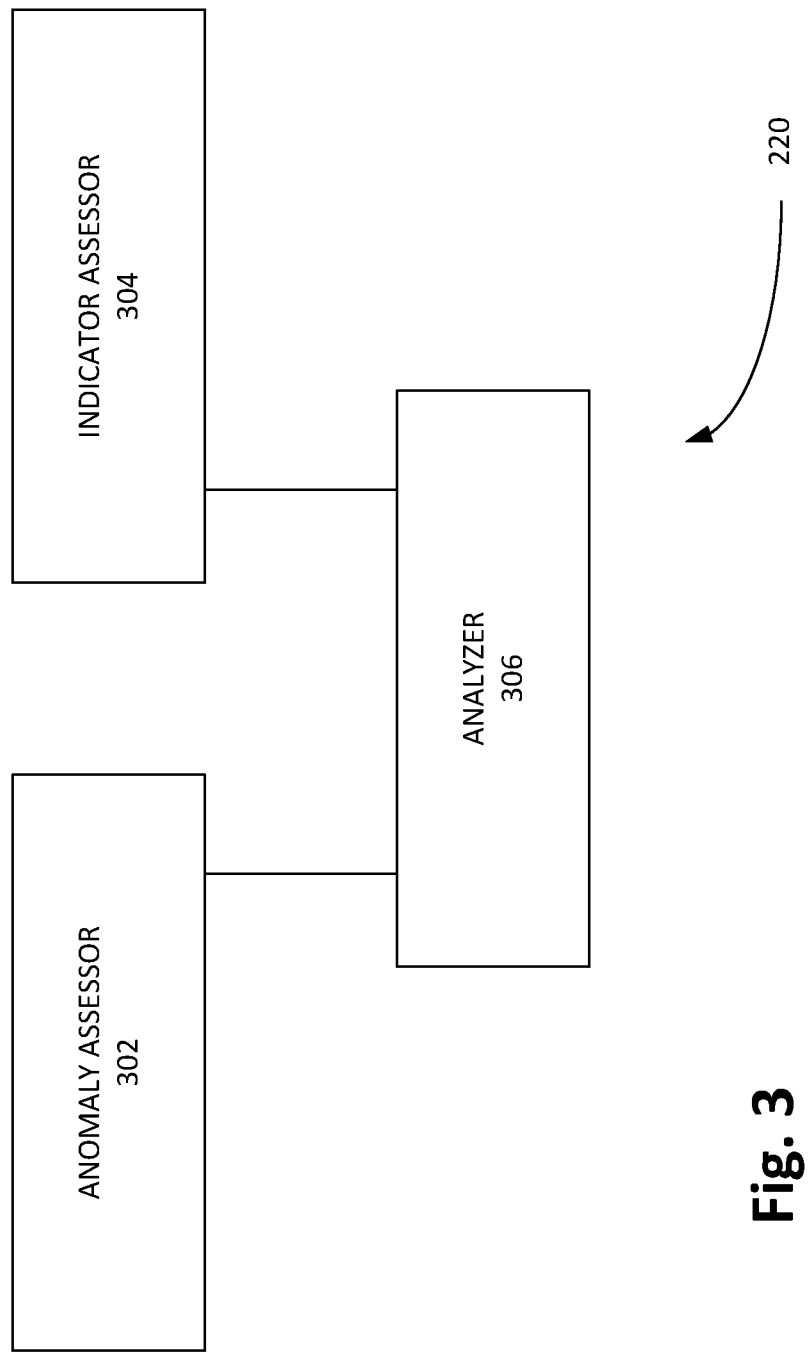
FIG. 3 is a block diagram illustrating an example abnormal classic authorization detector of the network of FIG. 2.

FIG. 3 illustrates an example abnormal classic authorization detection system 220. In one example, the abnormal classic authorization detection system 220 is implemented as system having a processor and a memory device such as processor 102 and memory 104 on computing device 100. The memory device, such as memory 104 can be applied to store computer executable instructions for causing the processor 102 to perform a method that is configured as a program for intrusion detection. The abnormal classic authorization detection system 220 provides cybersecurity for a device, which can include a computing device 100, a plurality of computing devices 100 that may be networked together, and a system including a resource access management system 202 that may be located on premises or in a cloud system. In the illustrated example, the abnormal classic authorization detection system 220 is implemented as a plurality of components. The example abnormal classic authorization detection system 220 includes an anomaly assessor 302 and an indicator assessor 304 that provide inputs to an analyzer 306.

The anomaly assessor 302 can consider several factors related to the classic assignment event from various perspectives, such as from the subscription perspective, the assignor perspective, and the assignee perspective. The anomaly assessor 302 determines anomalous behavior in the classic assignment event from the various perspectives, and can determine a score, such as an anomaly security score, based on the anomalous behavior or relative to the anomalous behavior. The anomaly assessor 302 is based on a machine learning model that can receive classic assignment events. The machine learning model can determine trends and expected actions based on the various classic assignment events for the enterprise or for the environment, which may include a plurality of tenants 216. The machine learning model, including anomaly detection, learns behavioral patterns across different perspectives, such as assigner, assignee, subscription, based on information including the software being used to issue the operation, when it was issued and from where. This information is engineered into features on which a machine learning model can be trained. An anomaly security score can be generated and based upon an irregular set of classic assignment events. For instance, an irregular creation event may generate a relatively high or low anomaly security score based on a selected relative scale. Whereas a non-suspicious classic assignment event according to the model of the anomaly assessor 302 may generate the anomaly security score within an expected range for non-suspicious classic events.

The indicator assessor 304 includes a set of rule-based logic to analyze classic assignment events, or actions, regarding the circumstances of a creation of classic assignment. In one example, the indicator assessor 304 has access to the logs and other information regarding the creation or modification of the classic assignment, or classic assignment event. The indicator assessor 304 can consider circumstances of the creation of the classic assignment such as who created assignment, when was it created, what was the position of the assignee prior to the current assignment, and other circumstances. In one example, a rule may be used that determines how often the assignor of the classic assignment creates or modifies classic assignment for the enterprise, a rule may be used that determines the level or amount of changes in the permissions for the assignee, or a rule may take into consideration issues such as whether the assignment was successful, what was the operation result, and other circumstances of the assignor, the assignee, the subscription including actions after the creation event of the classic assignment. An indicator security score can be generated and based upon application of the rules. For instance, the rules applied to an irregular creation event of a classic assignment may generate a relatively high or low indicator security score based on a selected relative scale to indicate a suspicious classic assignment event. Whereas a non-suspicious classic assignment event according to the rules of the indicator assessor may generate an indicator security score within an expected range for non-suspicious classic events.

The analyzer 306 receive inputs from the anomaly assessor 302 and the indicator assessor 304, including the anomaly security score and the indicator security score, and develop a final security score from which to take an action. Examples of possible actions based on the final security score can include preventing access to the resources, denying the user from receiving the classic administrator permission, denying the assignor from access and further assigning permissions to other users, alerting an administrator, or actively allowing the access or permission to control. The final security score can be based on the combination of the anomaly security score and the indicator security score. For example, the anomaly security score and the indicator security score may be added together or weighted and then added together, to determine the final security score, and then the final security score compared to a threshold amount to determine an action. In another example, the final security score is determined from the higher of the anomaly security score and the indicator security score, which is then compared to a threshold amount to determine an action.

In some examples, the final security score is compared to a threshold, and an action is taken depending on how the final security score relates to the threshold in a selected manner. Final security scores outside of a threshold value may indicate a high risk or suspicious classic administrator creation event, and final security scores within a threshold value may indicate a low security risk for the classic administrator creation event. For instance, a relatively low final security score may be indicative of high security risk, and a threshold value may be set such that final security scores falling outside the threshold value are denied access or permission change pending an administrator action while security scores falling within the threshold value are allowed access. In other examples, a plurality of actions can be implemented based on a plurality of thresholds applied to the final security score. For example, two threshold values may be used in which a first threshold value is greater than a second threshold value. In this example, a first action may be taken for final security scores falling above the first threshold value, such as access or permissions may be allowed; a second action may be taken for final security scores falling between the first and second threshold value, such as a conditional access is allowed and an alert regarding the permission is provided to an administrator; and a third action may be taken for final security scores that fall below the second threshold value, such as access or permissions are denied and alerts are issued.

Figure 4:
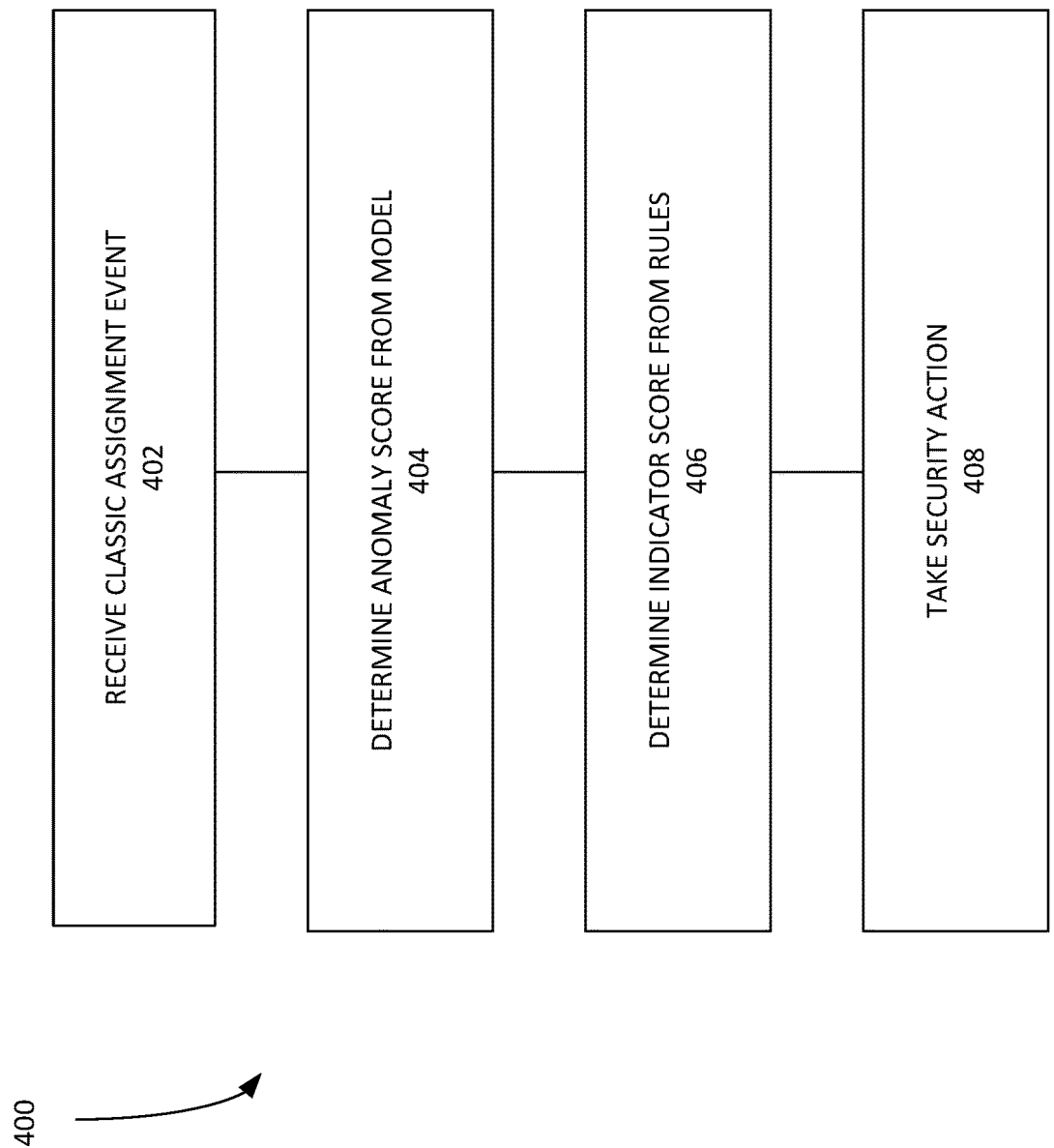
FIG. 4 is a block diagram illustrating an example method of the abnormal classic authorization detector of FIG. 2.

FIG. 4 illustrates a method 400 performed with or assisted by the abnormal classic authorization detection system 220 to provide cybersecurity for a computer network or resource access management system 202. In one example, the method 400 is implemented as system having a processor and a memory device such as processor 102 and memory 104 on computing device 100. The memory device, such as memory 104 can be applied to store computer executable instructions for causing the processor 102 to perform the method 400, such as a program for intrusion detection or determining the security of the resource access management system 202. The program for intrusion detection can include a program for assessing anomalies in the creation or modification of classic administration permissions 302, such as via a program to provide the machine learning model to generate the anomaly security score, a program for assessing indicators for applying a rule-based mechanism against information regarding classic administrator events 304, and a program to determine a final security score 306 from an analysis of the inputs received from programs 302 and 304. The method 400 provides cybersecurity for the system 202, which can include a computing device 100, a plurality of computing devices 100 that may be networked together and that may be located on premises or in a cloud system. In one example, the method 400 is implemented with abnormal classic authorization detection system 220 that includes the anomaly assessor 302 and the indicator assessor 304 to provide inputs to the analyzer 306.

Method 400 includes receiving a classic administrator position and the creation event for the position at 402. The receiving the classic administrator position and creation event for the position can be in response to a change in position level detected by the classic authorization detection system 220. An anomaly score is determined from suspected anomalies in a model related to the classic assignment event at 404, such as assignment of the classic administrator position of the classic administrator positions. An indicator score is determined from the classic assignment event applied to domain-based rules regarding the assignment of the classic administrator position of the classic administrator position at 406. An action is taken based on the security scores at 408. Examples of possible actions based on the security scores, such as the anomaly score and the indicator score can include preventing access to the resources, alerting an administrator, or actively allowing the permission and access.

In an example of generating or determining an anomaly score from suspected anomalies in a model related to the classic assignment event at 404, several factors related to the classic assignment event from various perspectives, such as from the subscription perspective, the assignor perspective, and the assignee perspective. Anomalous behaviors in the classic assignment event can be considered from the various perspectives, and the anomaly security score is based on the anomalous behavior or relative to the anomalous behavior. Anomalies can be determined from a machine learning model that can receive classic assignment events. The machine learning model can determine trends and expected actions based on the various classic assignment events for the enterprise or for the environment, which may include a plurality of tenants 216. The machine learning model, including anomaly detection, learns behavioral patterns across different perspectives, such as assigner, assignee, subscription, based on information including the software being used to issue the operation, when it was issued and from where. This information is engineered into features on which a machine learning model can be trained. The anomaly security score can be generated and based upon an irregular set of classic assignment events. For instance, an irregular creation event of a may generate a relatively high or low anomaly security score based on a selected relative scale. Whereas a non-suspicious classic assignment event according to the model may generate the anomaly security score within an expected range for non-suspicious classic events.

In an example of determining from the classic assignment event applied to domain-based rules regarding the assignment of the classic administrator position of the classic administrator position at 406, a set of rule-based logic is applied to analyze classic assignment events, or actions, regarding the circumstances of a creation of classic assignment. In one example, logs and other information regarding the creation or modification of the classic assignment, or classic assignment event are retrieved and considered. The circumstances of the creation of the classic assignment is considered by the rules such as who created assignment, when was it created, what was the position of the assignee prior to the current assignment, and other circumstances. In one example, a rule may be used that determines how often the assignor of the classic assignment creates or modifies classic assignment for the enterprise, a rule may be used that determines the level or amount of changes in the permissions for the assignee, or a rule may take into consideration issues such as whether the assignment was successful, what was the operation result, and other circumstances of the assignor, the assignee, the subscription including actions after the creation event of the classic assignment. An indicator security score is generated and based upon application of the rules. For instance, the rules applied to an irregular creation event of a classic assignment may generate a relatively high or low indicator security score based on a selected relative scale to indicate a suspicious classic assignment event. Whereas a non-suspicious classic assignment event according to the rules of the indicator assessor may generate an indicator security score within an expected range for non-suspicious classic events.

In an example of action taken based on the security scores at 408, the anomaly security score and the indicator security score are received and use to develop a final security score from which to take an action. Examples of possible actions based on the security score can include preventing access to the resources, denying the user from receiving the classic administrator permission, denying the assignor from access and further assigning permissions to other users, alerting an administrator, or actively allowing the access or permission to control. The final security score can be based on the combination of the anomaly security score and the indicator security score. For example, the anomaly security score and the indicator security score may be added together or weighted and then added together, to determine the final security score, and then the final security score compared to a threshold amount to determine an action. In another example, the final security score is determined from the higher of the anomaly security score and the indicator security score, which is then compared to a threshold amount to determine an action.

In some examples, the final security score is compared to a threshold, and an action is taken depending on how the final security score relates to the threshold in a selected manner. Final security scores outside of a threshold value may indicate a high risk or suspicious classic administrator creation event, and final security scores within a threshold value may indicate a low security risk for the classic administrator creation event. For instance, a relatively low final security score may be indicative of high security risk, and a threshold value may be set such that final security scores falling outside the threshold value are denied access or permission change pending an administrator action while security scores falling within the threshold value are allowed access. In other examples, a plurality of actions can be implemented based on a plurality of thresholds applied to the final security score. For example, two threshold values may be used in which a first threshold value is greater than a second threshold value. In this example, a first action may be taken for final security scores falling above the first threshold value, such as access or permissions may be allowed; a second action may be taken for final security scores falling between the first and second threshold value, such as a conditional access is allowed and an alert regarding the permission is provided to an administrator; and a third action may be taken for final security scores that fall below the second threshold value, such as access or permissions are denied and alerts are issued.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method to provide cybersecurity to a classic authorization system of a resource access management system, the method comprising:
   determining an anomaly score by applying a model to a first log, a second log, and a third log regarding a classic assignment event in which a classic administrator role is assigned to a user,
      wherein the first log describes the classic assignment event from a perspective of an assignor who assigns the classic administrator role to the user,
      wherein the second log describes the classic assignment event from a perspective of the user to whom the classic administrator role is assigned, and
      wherein the third log describes the classic assignment event from a perspective of a subscription in a resource access management system;
   determining an indicator score by applying domain-based rules to the classic assignment event in which the classic administrator role is assigned to the user; and
   taking a security action based on a combination of the anomaly score, which is determined using the model, and the indicator score, which is determined using the domain-based rules.

2. The method of claim 1, wherein the determining the anomaly score and the determining the indicator score are based on receiving logs from the resource access management system.

3. The method of claim 2, wherein the resource access management system comprises a fine-grained authorization system.

4. The method of claim 1, wherein the security action is based on comparing the anomaly score and the indicator score to a selected threshold.

5. The method of claim 4, wherein the security action comprises a plurality of actions and the selected threshold comprises a plurality of selected thresholds.

6. The method of claim 5, wherein an action of the plurality of actions is associated with comparing the anomaly score and the indicator score to two thresholds of the plurality of selected thresholds.

7. The method of claim 1, wherein a rule of the domain-based rules comprises a determination as to whether an operation was successful.

8. The method of claim 1, wherein the classic assignment event comprises an assignment of a co-administrator role to the user, the co-administrator role granting the user permission to manage services in a platform portal of the resource access management system.

9. The method of claim 8, wherein the classic assignment event comprises the assignment of the co-administrator role to the user from another user having a co-administrator role.

10. The method of claim 1, wherein the anomaly score and the indicator score are combined to form a final security score.

11. The method of claim 1, wherein the classic administrator role grants full access to the subscription in the resource access management system to the user.

12. A computer readable storage device to store computer executable instructions to control a processor to:
   determine an anomaly score by applying a model to a first log, a second log, and a third log regarding a classic assignment event in which a classic administrator role is assigned to a user,
      wherein the first log describes the classic assignment event from a perspective of an assignor who assigns the classic administrator role to the user,
      wherein the second log describes the classic assignment event from a perspective of the user to whom the classic administrator role is assigned, and
      wherein the third log describes the classic assignment event from a perspective of a subscription in a resource access management system;
   determine an indicator score by applying domain-based rules to the classic assignment event in which the classic administrator role is assigned to the user; and
   take a security action based on a combination of the anomaly score, which is determined using the model, and the indicator score, which is determined using the domain-based rules.

13. The computer readable storage device of claim 12, comprising a machine learning model to determine the anomaly score.

14. The computer readable storage device of claim 13, wherein the anomaly score is based on an irregular set of classic assignment events and a relative amount of permissions.

15. The computer readable storage device of claim 12, wherein the security action comprises providing a security alert.

16. The computer readable storage device of claim 12, wherein the security action is based on a plurality of available actions that are related to the combination of the anomaly score and the indicator score.

17. The computer readable storage device of claim 12, wherein the classic administrator role is configured to grant full access to the subscription in the resource access management system to the user.

18. A system, comprising:
- a memory device that stores a set of instructions; and
- a processor to execute the set of instructions to:
  - determine an anomaly score by applying a model to a first log, a second log, and a third log regarding a classic assignment event in which a classic administrator role is assigned to a user,
    - wherein the first log describes the classic assignment event from a perspective of an assignor who assigns the classic administrator role to the user,
    - wherein the second log describes the classic assignment event from a perspective of the user to whom the classic administrator role is assigned, and
    - wherein the third log describes the classic assignment event from a perspective of a subscription in a resource access management system;
  - determine an indicator score by applying domain-based rules to the classic assignment event in which the classic administrator role is assigned to the user; and
  - take a security action based on a combination of the anomaly score, which is determined using the model, and the indicator score, which is determined using the domain-based rules.

19. The system of claim 18 comprised in a cloud-based environment, wherein the cloud-based environment comprises an identity access management system.

20. The system of claim 18, wherein the classic administrator role is configured to grant full access to a subscription in the resource access management system to the user.

* * * * *